United States Patent
Matsuura

(10) Patent No.: US 7,213,453 B2
(45) Date of Patent: May 8, 2007

(54) JUDGING METHOD OF VEHICLE LOADING CONDITION

(75) Inventor: Shinichi Matsuura, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/184,928

(22) Filed: Jul. 20, 2005

(65) Prior Publication Data

US 2006/0042367 A1    Mar. 2, 2006

(30) Foreign Application Priority Data

Aug. 11, 2004    (JP)    ............... 2004-234486

(51) Int. Cl.
  *G01M 17/02*    (2006.01)
(52) U.S. Cl. ..................... 73/146; 340/444
(58) Field of Classification Search .......... 73/146, 73/146.2, 146.3, 146.4, 146.5, 146.8; 340/442, 340/443, 444, 445, 446, 447, 448
See application file for complete search history.

(56) References Cited

U.S. PATENT DOCUMENTS

| | | | |
|---|---|---|---|
| 6,420,966 B2* | 7/2002 | Sugisawa | 340/442 |
| 6,439,045 B1* | 8/2002 | Latarnik et al. | 73/146.5 |
| 6,804,623 B2* | 10/2004 | Oshiro | 702/140 |
| 7,013,721 B2* | 3/2006 | Keller et al. | 73/146 |
| 2003/0128110 A1 | 7/2003 | Sugisawa | |
| 2005/0044946 A1* | 3/2005 | Agrotis | 73/146.5 |
| 2005/0087008 A1* | 4/2005 | Yanase | 73/146 |
| 2005/0097949 A1* | 5/2005 | Hillenmayer et al. | 73/146 |
| 2005/0235744 A1* | 10/2005 | Ogawa | 73/146 |
| 2005/0274177 A1* | 12/2005 | Oshiro et al. | 73/146.5 |

FOREIGN PATENT DOCUMENTS

| | | |
|---|---|---|
| EP | 1 527 909 A2 | 5/2005 |
| JP | 8-145654 A | 6/1996 |
| JP | 2003-220811 A | 8/2003 |
| JP | 2003-267012 A | 9/2003 |
| JP | 2003-291616 A | 10/2003 |
| JP | 2003-326927 A | 11/2003 |
| JP | 2004-017717 A | 1/2004 |

\* cited by examiner

*Primary Examiner*—Eric S. McCall
(74) *Attorney, Agent, or Firm*—Birch, Stewart, Kolasch & Birch, LLP

(57) ABSTRACT

A method of judging a vehicle loading condition includes detecting rotational speeds of wheels mounted on a vehicle, calculating a judging value of tire pressures based on the difference of the sum of rotational speeds of two pairs of wheels located at the opposing corners of the vehicle and detecting an acceleration to a lateral direction of the vehicle. The loading state of the vehicle is judged by the change of a primary coefficient based on an approximated relation between the acceleration to a lateral direction and the judging value of the tire pressures. A tire deflation warning system detects the stop of the vehicle, and the air pressure of four wheels is judged not to be decreased if the loading condition of a vehicle is changed more than a fixed value before and after a vehicle stop. The tire deflation warning system can prevent a deflation alarm for a vehicle with a heavy load.

10 Claims, 8 Drawing Sheets

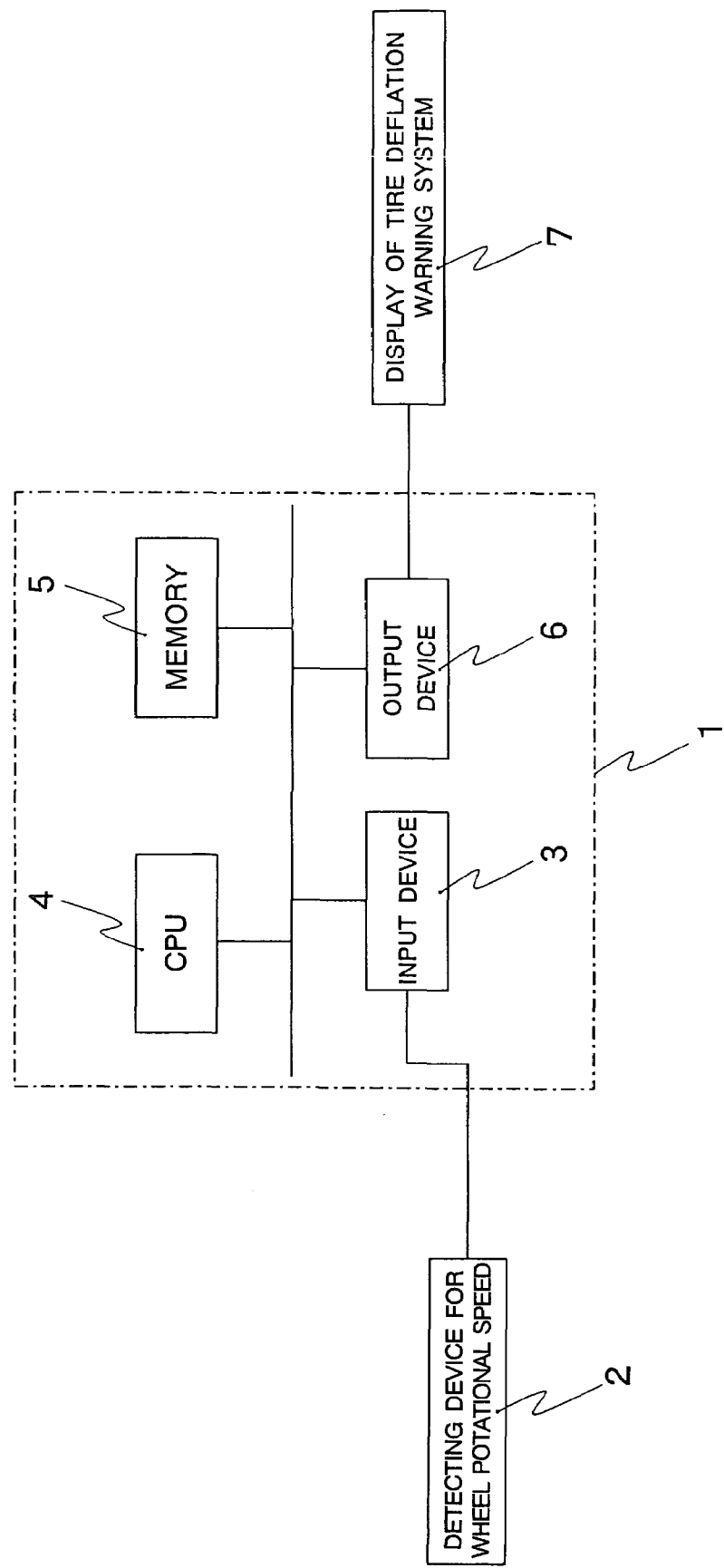

JUDGING METHOD OF VEHICLE LOADING CONDITION

BACKGROUND OF THE INVENTION

The present invention relates to a judging method of loading condition of a vehicle with four wheels. Further, the present invention relates to a device for detecting whether the pressures of four wheels are simultaneously decreased or not in the vehicle with four wheels. More specifically, the present invention relates to a device for judging four-wheel diffusion by distinguishing a case of high loading on a vehicle.

There is a method of using the judging value of tire pressures based on the difference of the sums of rotational speeds of two pair of wheels which are located at the opposite corners of a vehicle, in order to detect that the tire pressures are decreased. However, the diffusion of one wheel or two wheels located at the opposite corners can be detected by the judging value of tire pressures, but it cannot be detected that the pressures of four wheels are simultaneously decreased.

The tire pressure is gradually lowered even if the tires are not damaged. Simultaneous decreased pressure occurs occasionally because air permeates the rubber of tires, in addition to simultaneous decreased pressure caused by the dimension growth of new tires. In such a case, the pressures of four wheels are often simultaneously decreased; therefore one happens to be not aware of the decreased pressure. When a vehicle runs while the air pressures of four tires are simultaneously decreased, there is danger of provoking the burst of tires at high speed running and gas mileage is also deteriorated; therefore there is also a concern over influence on the environment.

In order to alarm the four-wheel diffusion, there is a "load sensitivity method" which judges diffusion by utilizing rotational property (the difference of rolling=the difference of load fluctuation) at the decreased pressure of four wheels. The principle utilizes that the inclination of the acceleration to a lateral direction of a vehicle (hereinafter, referred to as Lateral G) to the judging value of tire pressures (hereinafter, referred to as DEL value) differs between at normal time and at the time of the four-wheel diffusion.

FIG. 1 is an example in which the Lateral G and DEL value are plotted in a case that tires are at normal air pressure and a case that the pressures of four wheels are decreased together by 40%. A regression straight line is calculated against a combination of the Lateral G and DEL value and its primary coefficient (inclination) is referred to as the load sensitivity. As shown in FIG. 1, the load sensitivity (the inclination of Lateral G to DEL value) differs between a case of normal air pressure and a case that the pressures of four wheels are decreased. Accordingly, when the load sensitivity is changed at a fixed value or more in comparison with the inclination of the normal air pressure, it can be detected that the pressures of four wheels are decreased.

However, the load sensitivity method is sensitive for a load as shown by its name, and the procedure shown in the fore-description is limited to a case that a load is nearly constant.

Further, there is a method of detecting four-wheel diffusion by measuring the load through providing a load sensor and correcting the load sensitivity in accordance with the load (Japanese Unexamined Patent Publication No. 145654/1996).

SUMMARY OF THE INVENTION

According to the load sensitivity method, the simultaneous four-wheel diffusion can be detected for the same load condition. However, when the load of a vehicle differs, the inclination considerably differs between a case of a light load (2 persons boarding) and a case of a standard load (at vehicle gross weight) unless the load of a vehicle is detected to be corrected, because the load sensitivity (the primary approximate coefficient of the Lateral G to the DEL value) is changed according to the load of a vehicle; therefore when the inclination is changed at a fixed value or more is determined to as the four-wheel diffusion, a heavy load is detected as the four-wheel diffusion even if tires have normal air pressures.

Consequently, in order to precisely judge the four-wheel diffusion, it is necessary to distinguish whether the difference of the primary approximate coefficient of the Lateral G–DEL value is caused by the decreased pressure or by the load.

It is the purpose of the present invention to provide a method of judging the loading state of a vehicle irrespective of a load sensor.

In the present invention, after classifying the possible maximum load of a vehicle to categories of, for example, a light load, a middle load or a heavy load, it is judged that the vehicle belongs to which categories of the load at the moment.

Further, it is the purpose of the present invention to provide a tire deflation warning system which detects the decreased pressure of four wheels by the load sensitivity method utilizing the fore-mentioned judgment result of the loading state, wherein the air pressure of four wheels is not decreased in case of a heavy load, and it can be prevented to falsely alarm the decreased pressure of four wheels.

The judging method of vehicle loading condition of the present invention includes the steps of:

detecting the rotational speeds of wheels mounted on a vehicle;

calculating the judging value of the tire pressures based on the difference of the sum of rotational speeds of two pairs of wheels located at the opposing corners of the vehicle;

detecting the acceleration to a lateral direction of the vehicle; and detecting the stop of the vehicle;

wherein the loading state of the vehicle is judged by the change of a primary coefficient when relation between the acceleration to a lateral direction and the judging value of the tire pressures is primarily approximated before and after the stop of the vehicle.

Further, the tire deflation warning system of the present invention includes the means for detecting the acceleration to a lateral direction through calculating based on the difference of the left and right wheels of the rotational speeds of the wheels.

The means for detecting the stop of the vehicle preferably detects that the rotational speeds of the wheels are continuously zero for a fixed time.

Further, the means for detecting the stop of the vehicle may detect that the ignition switch of the vehicle is switched off.

The judging method of the decreased tire pressures of the present invention includes the steps of: detecting the rotational speeds of wheels mounted on a vehicle; calculating the judging value of the tire pressures based on the difference of the sum of rotational speeds of two pairs of wheels located at the opposing corners of the vehicle; and detecting the acceleration to a lateral direction of the vehicle, wherein the four-wheel diffusion is detected by a primary coefficient when relation between the acceleration to a lateral direction and the judging value of the tire pressure is primarily approximated, wherein the air pressure of four wheels of the vehicle is judged not to be decreased when the primary coefficient is changed at a fixed value or more before and after the stop of the vehicle.

The tire deflation warning system of the present invention includes: means for detecting the rotational speeds of wheels mounted on a vehicle; means for calculating the judging value of the tire pressures based on the difference of the sum of rotational speeds of two pairs of wheels located at the opposing corners of the vehicle; and means for detecting the acceleration to a lateral direction of the vehicle, wherein the four-wheel diffusion is detected by a primary coefficient when relation between the acceleration to a lateral direction and the judging value of the tire pressures are primarily approximated, wherein the system includes means for detecting the stop of the vehicle and the pressures of four wheels are judged not to be decreased when the primary coefficient is changed at a fixed value or more before and after the stop of the vehicle.

The detection program of the decreased tire pressures of the present invention includes steps of: detecting the rotational speeds of wheels mounted on a vehicle; calculating the judging value of the tire pressures based on the difference of the sum of rotational speeds of two pairs of wheels located at the opposing corners of the vehicle; and detecting the acceleration to a lateral direction of the vehicle, wherein the four-wheel diffusion is detected by a primary coefficient when relation between the acceleration to a lateral direction and the judging value of the tire pressures are primarily approximated, wherein the stop of the vehicle is detected and the pressures of four wheels are judged not to be decreased when the primary coefficient is changed at a fixed value or more before and after the stop of the vehicle.

The present invention detects whether the pressures of four wheels are simultaneously decreased or not for a vehicle with four wheels and does not detect the presence or absence of the decreased pressures of one wheel, two wheels or three wheels among four wheels.

The invention classifies the possible maximum load of a vehicle to categories of, for example, a light load (for example, 0 to 30% of the maximum load), a middle load (for example, 30 to 70% of the maximum load) or a heavy load (for example, 70 to 100% of the maximum load), and enables to judge which categories of the load the vehicle is at present (namely, the loading state of the vehicle).

Further, the judging method of vehicle loading condition of the present invention can judge that the load is changed when the change of the load sensitivity is large before and after the stop of a vehicle, based on the principle that change by the load is larger than the change by air pressure (decreased pressure), and can judge the loading state. For example, in an example shown in the Embodiments described later, when the condition is changed from 2 persons boarding to 5 persons boarding+the load of 100 kg of a package for a passenger car (Chevrolet®, IMPALA®, it can be judged that a light load was changed to a heavy load.

Further, in the tire deflation warning system which detects the decreased pressure of four wheels by the load sensitivity method through utilizing the judgment result of the loading state, there can be provided the tire deflation warning system in which in the case that the load state of a vehicle is judged as a "heavy load", the air pressure of four wheels is judged not to be decreased and to false alarming for the decreased pressure of four wheels can be prevented. However, the tire deflation warning system of the present invention cannot prevent that the four-wheel diffusion is falsely alarmed when the load state of a vehicle is judged as a "middle load" or a "light load".

According to the present invention, it can be judged by the rotational speeds of wheels without using the load sensor of a vehicle whether the load is a light load or a heavy load.

According to the present invention, when the tire pressures of a vehicle are normal and the load is a heavy load, it can be prevented that the four-wheel diffusion is falsely alarmed.

BRIEF DESCRIPTION OF THE DRAWINGS

FIG. 7 is a block chart showing the composition of the tire deflation warning system in the Embodiment of the present invention.

DETAILED DESCRIPTION

In the Embodiments of the present invention, the judging value of the tire pressure (hereinafter, referred to as DEL value) and the acceleration to a lateral direction (hereinafter, referred to as Lateral G) are the values as shown in the following formula.

$$DEL=((V1+V4)-(V2+V3))/V\text{mean} \quad \text{Lateral } G=V^2/R$$

Herein, V1 represents the rotational speed of a left front wheel, V2 represents that of a right front wheel, V3 represents that of a left rear wheel and V4 represents that of a right rear wheel. The rotational speed is the rotational angular velocity of a wheel×the radius of a tire. Vmean is the average of the rotational speeds of four wheels. V of Lateral G is the speed of a vehicle, R is a rotational radius, and for example, it can be calculated from the difference of the rotational speeds of following wheels and tread widths. For example, in the case of a FR vehicle, after the speeds V1 and V2 of tires FL and FR of following wheels are calculated, the rotational radius, R is calculated by the following formula.

$$R=\{(V2+V1)/(V2-V1)\}\times Tw/2$$

Herein, Tw is a distance (tread width) (m) between kingpins.

Further, the acceleration to a lateral direction can be determined by a sensor for the acceleration to a lateral direction. A yaw rate sensor may be provided for a vehicle to measure the Lateral G by utilizing its output.

Figure 1:
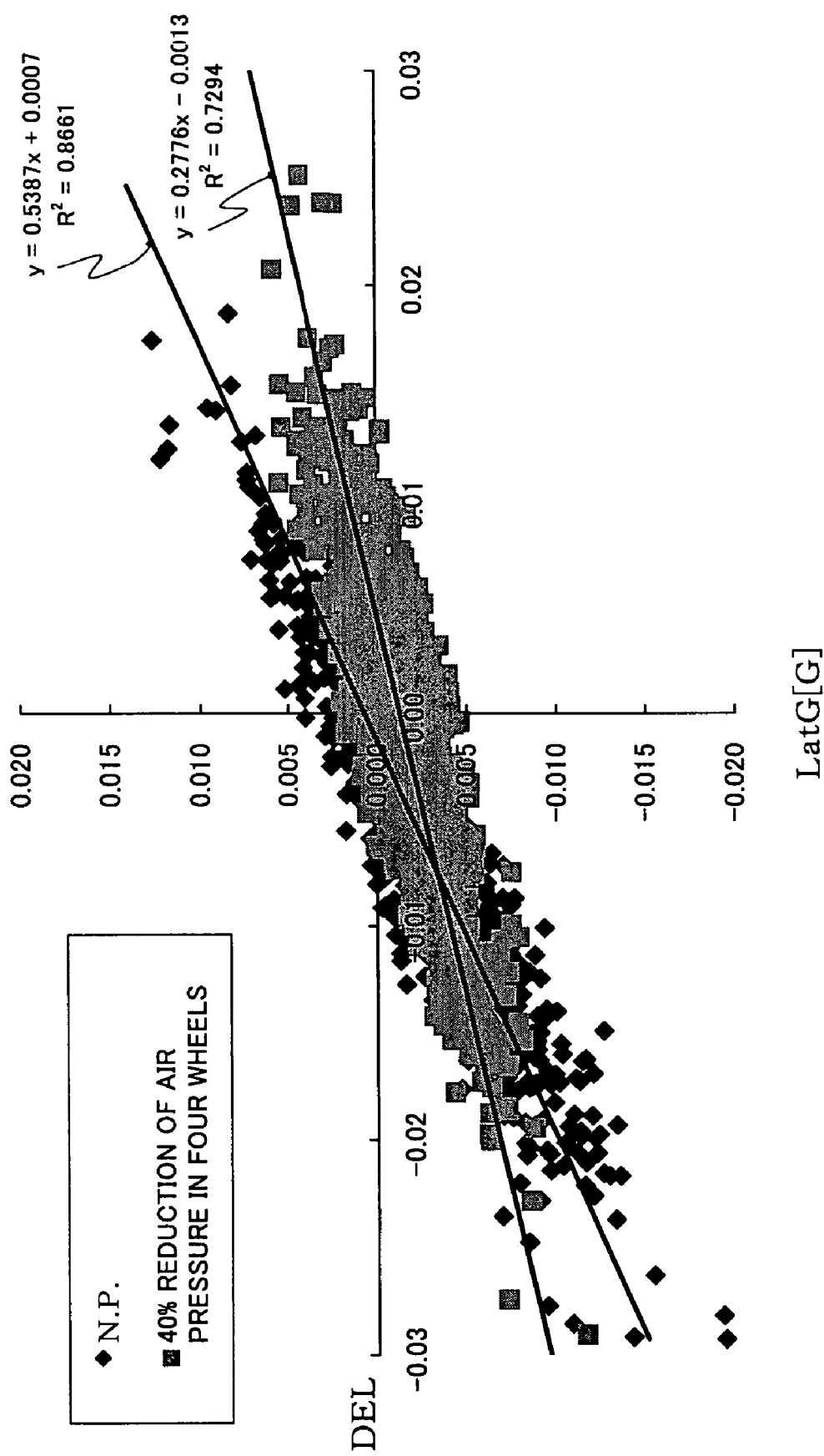
FIG. 1 is a graph representing relation between the lateral acceleration and the judging value of air pressure lowering.

FIG. 1 is a graph showing a result in which the Lateral G and DEL value are measured after 30 minutes running respectively for a case that the tire pressures are normal and a case that the pressures of four wheels are decrease together by 40%. In FIG. 1, ♦ indicates the running data in a case that the tire pressures are normal (N.P.) and ■ (half-tone dot meshing in FIG. 1) indicates the running data in a case that a vehicle runs in a state in which the pressures of four wheels are decreased together by 40%. In FIG. 1, the horizontal axis is Lateral G and the vertical axis is DEL value. When inclination is determined from the data for 30 minutes, a high correlation coefficient could be obtained. The primary coefficients of the primary approximate straight lines were respectively 0.5387 for a case with the normal air pressure and 0.2776 for a case with the decreased pressure by 40%.

Embodiment 1

FIGS. 2(a) to 2(d) and FIGS. 3(a) to 3(d) are graphs in which the primary coefficients (inclination=load sensitivity) which were obtained by primarily approximating the respective relation between the acceleration to a lateral direction (hereinafter, referred to as Lateral G) and the judging value of tire pressures (hereinafter, referred to as DEL value) in the case that a vehicle run under various conditions were represented for a case that the tire pressures are normal, a case of diffusion by 20% and a case of diffusion by 40%. The vehicle used is Chevrolet® IMPALA® manufactured by Chevrolet® Automobile Co., Ltd.

Figure 2A:
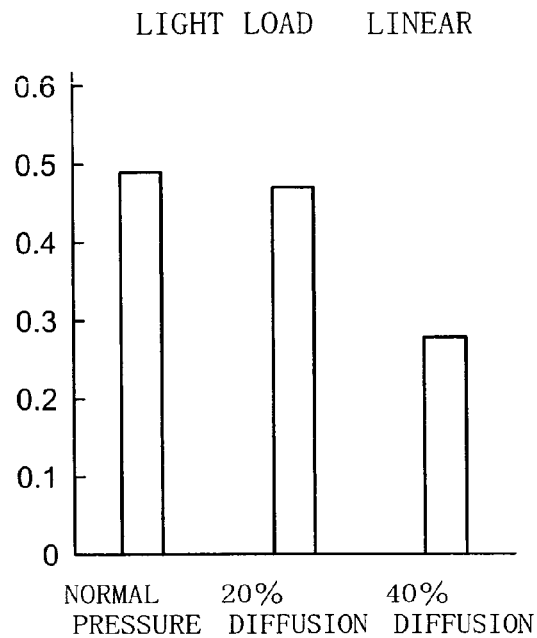
FIGS. 2(a) to 2(d) are graphs each showing the aspect in which the primary coefficient of the relation between the lateral acceleration and the judging value of air pressure lowering is changed for normal pressure, pressure is decreased by 20% and pressure is decreased by 40%, wherein FIG. 2(a) indicates a case of a light load and linear running, FIG. 2(b) indicates a case of a light load and the presence of a lane change, FIG. 2(c) indicates a case of a light load and linear running in rain, and FIG. 2(d) indicates a case of a light load and the presence of a lane change in rain.
Figure 2B:
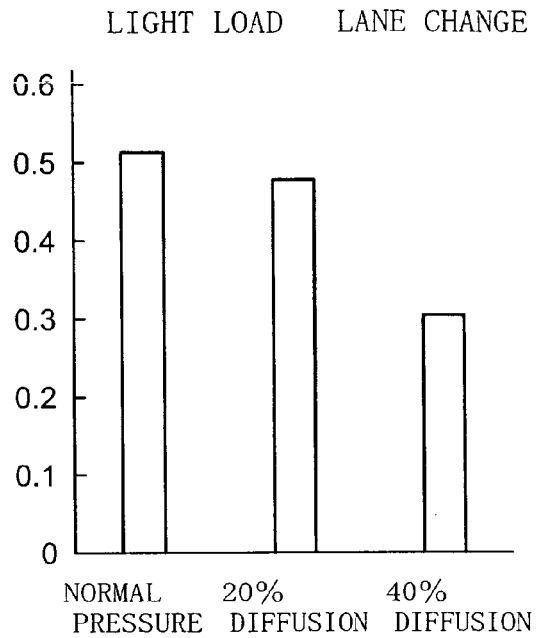
Figure 2C:
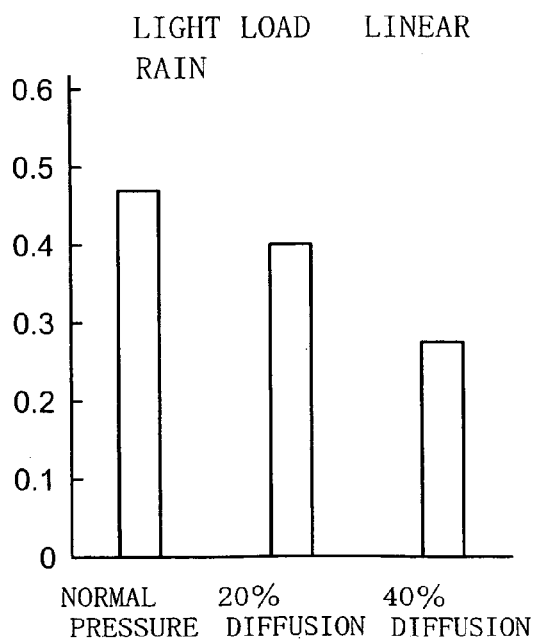
Figure 2D:
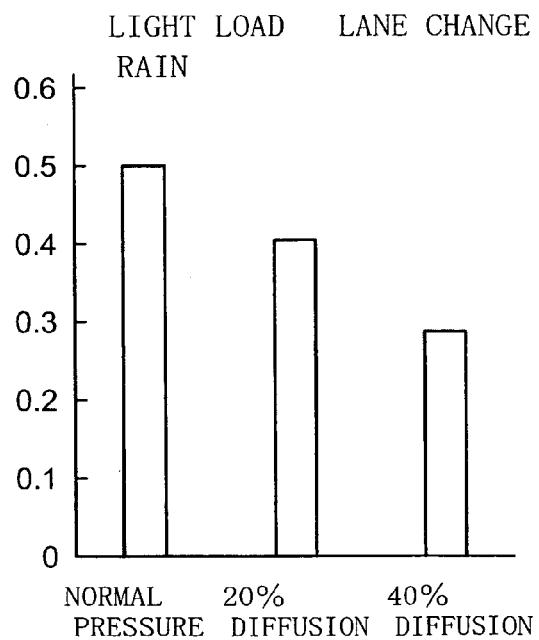

FIG. 2(a) indicates a case of a light load and linear running, FIG. 2(b) indicates a case of a light load and the presence of a lane change, FIG. (c) indicates a case of a light load and linear running in rain, and FIG. 2(d) indicates a case of a light load and the presence of a lane change in rain.

Figure 3A:
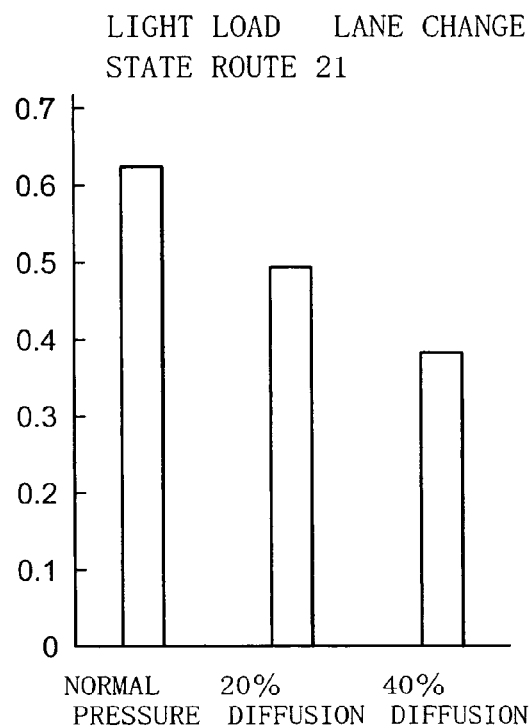
FIGS. 3(a) to 3(d) are graphs each showing the aspect in which the primary coefficient of the relation between the lateral acceleration and the judging value of air pressure lowering is changed for normal pressure, pressure is decreased by 20% and pressure is decreased by 40%, wherein FIG. 3(a) indicates a case that the vehicle run on State route 21 under a light load and the presence of a lane change, FIG. 3(b) indicates a case that the vehicle run on State route 21 in rain under a light load and the presence of a lane change, FIG. 3(c) indicates a case of a standard load (standard mounting) and linear running, and FIG. 3(d) indicates a case of a standard load (standard mounting) and the presence of a lane change.
Figure 3B:
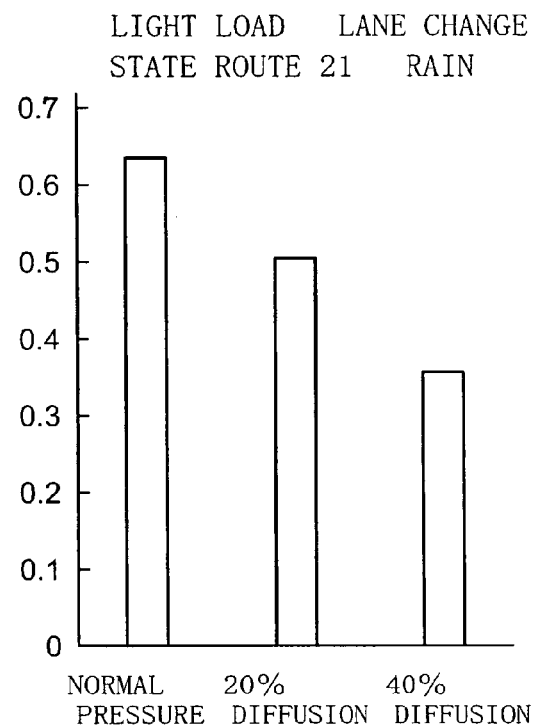
Figure 3C:
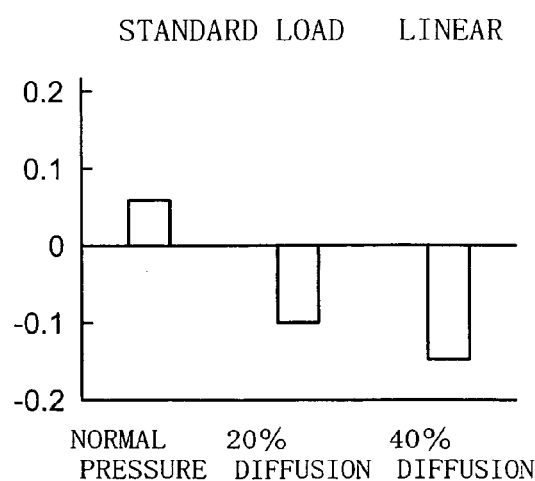
Figure 3D:
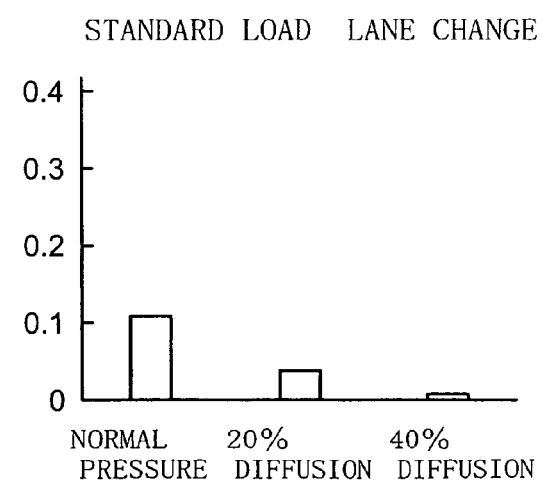

FIG. 3(a) indicates a case that the vehicle run on State route 21 under a light load and the presence of a lane change, FIG. 3(b) indicates a case that the vehicle run on State route 21 in rain under a light load and the presence of a lane change, FIG. 3(c) indicates a case of a standard load (standard mounting) and linear running, and FIG. 3(d) indicates a case of a standard load (standard mounting) and the presence of a lane change.

In FIGS. 2(a) to 2(d) and FIGS. 3(a) to 3(d), the light load is a case of 2 persons boarding and the standard load is a case of 5 persons boarding+10 kg of packages.

As grasped from comparison of FIG. 2(a) or 2(b) with FIG. 3(c) or 3(d) for the load sensitivity, the change caused by a load is larger than the change of air pressure (diffusion). It was grasped that the effect of a load is great for the load sensitivity and the load sensitivity was changed at diffusion by 40% or more under a standard loading condition (compare FIG. 2(a) or 2(b) with FIG. 3(c) or 3(d)). Herein, it is important that it is changed in proportion to the rate of diffusion in like manner as normal→diffused by 20% →diffused by 40%, in comparison under the standard loading condition. Accordingly, if a present load condition is grasped, the four-wheel diffusion can be detected even by the standard loading.

A so-called simultaneous four-wheel diffusion is a slow leak of air which is a reduction of several % over several months and the load sensitivity is gradually changed. To the contrary, the change of the load sensitivity caused by the change of a load fluctuates abruptly before and after the stop of a vehicle. Because the loading and unloading of passenger/package are not carried out during running, the load is changed before switching off an ignition switch and after switching on an ignition switch in many cases. It is considered that the loading and unloading of a package is not carried out during running but carried out at switching on/off an ignition switch (or 10 minutes or more and 30 minutes or less even during driving an engine).

Consequently, the load sensitivities before and after the stop of a vehicle are compared including the stop of a vehicle, and when the load sensitivity is large fluctuation (for example, the difference of inclination is 0.1 or more), it can be deduced that it is not the fluctuation of air but the fluctuation of a load. Since the change of the load sensitivity at the standard loading state is larger than the change of the load sensitivity at the rate of diffusion of tires (for example, 30%) at which the four-wheel diffusion shall be alarmed, the change of the load sensitivity at a fixed value or more is deduced to be the change of the load and is not judged as the four-wheel diffusion; therefore the error of diffusion judgment in the case of a heavy load can be prevented.

It can be detected by measuring a time at which the rotational speeds of wheels are zero that a vehicle was stopped. A case that the rotational speed of wheels is zero for a fixed time may be judged as stop. Alternatively, the output of the speed meter of a vehicle may be utilized. Alternatively, the stop may be judged by detecting that a parking break was operated and by detecting that an automatic transmission is set at a P range.

The changes of the load sensitivity before and after the stop of a vehicle may be compared, but since it is troublesome because there is a possibility that stopping at a red light for a long time is included, the load sensitivity is measured at a fixed time interval and when the change of the load sensitivity is large, the change of the load may be deduced. Namely, the four-wheel diffusion and the change of the load are distinguished according to sizes of the time change of the load sensitivity.

The load sensitivity is calculated and memorized at a fixed time interval (for example, data for 30 minutes by every two hours), but when the difference of the load is examined, a value just before switching off an ignition switch is retained and compared with a value after switching on the ignition switch (since the inclination changes slowly in case of the four-wheel diffusion, it is required to be retained for a further longer time).

According to the experiment of FIGS. 2(a) to 2(d), the load sensitivity at full load is nearly zero, and there is also a zone (FIG. 3(c)) in which the inclination is minus.

A range of the load sensitivity at which the decreased tire pressures may influence (0.15 or more for the case of FIG. 1) is assigned and when the load sensitivity is out of the range (less than 0.15 for the fore-mentioned case), it can be judged that the change of the load sensitivity is caused by the influence of a load.

As shown in FIGS. 2(a) to 2(d) and FIGS. 3(a) to 3(d), when a load is a light load and constant, the load sensitivity is generally within a fixed range by every rate of diffusion. On the other hand, since the load sensitivity is between −0.1 and 0.1 for a case of the standard loading, 0.4 or more is changed for the load sensitivity (−0.1 to 0.1) of the standard loading when it is judged as the decreased pressure by the value of the load sensitivity at diffusion by 40% (for example, alarm is issued when it is deviated by 0.2 from the normal air pressure=diffusion of 40% is alarmed) from the load sensitivity in the case of the normal air pressure at a light load; therefore it is judged as the air pressure lowering.

Observing the tendency of the inclination, the normal air pressure (0.5)→diffused by 40% (0.3)→diffused by 80% (0.1) is anticipated. Consequently, the diffusion and the standard loading can be distinguished so far as it is not diffused by 80% or more. When four wheels are diffused by 80% or more, a driver should notice before getting into the vehicle, and it is not possible in reality that the pressures of four wheels are decreased by 80% or more during running.

Thus, when the change of the load sensitivity is large before and after the stop of a vehicle, it can be judged that the load has been changed and the judgment of the loading state can be carried out. With respect to the examples of FIGS. 2(a) to 2(d) and FIGS. 3(a) to 3(d), when the condition of 5 persons boarding+the load of 100 kg is changed from the condition of 2 persons boarding in a passenger car (Chevrolet, IMPALA), it can be judged that a heavy load was changed from a light load.

Further, Embodiment 1 sets a passenger car (Chevrolet, IMPALA) as an objective, but the judging method of vehicle loading condition of the present invention can also judge the loading state also in vehicles with four wheels such as light vehicles, minivans, trucks and buses, although the numeral values are different.

Embodiment 2

FIG. 7 is a block chart showing an example of the tire deflation warning system in the present invention.

The tire deflation warning system 1 in Embodiment 2 is connected with a means 2 for detecting the rotational speeds of respective wheels and connected with a display device for the tire deflation warning system. The tire deflation warning system 1 is equipped with a calculation device 4, a memory 5 for memorizing a program and calculation data, an input device 3 for inputting the rotational speeds of wheels from the means of detecting the rotational speeds of wheels, and an output device 6 for outputting an alarm to the display device 7 for the tire deflation warning system. The speed of a vehicle may be detected and inputted in addition to the rotational speeds of wheels. Further, the alarm of the decreased tire pressures may be outputted to other vehicle control device and the like.

In Embodiment 2, it is described so that the judging program of the decreased tire pressures and data are memorized in the same memory, but the judging program of the decreased tire pressures may be memorized in ROM (read-only memory) and the data may be memorized in RAM (random access memory).

Further, it can be also functionalized as the judging device for vehicle loading condition by outputting the judging value (a light load, a heavy load and the like) of the loading state of a vehicle from the output device 6.

Figure 4:
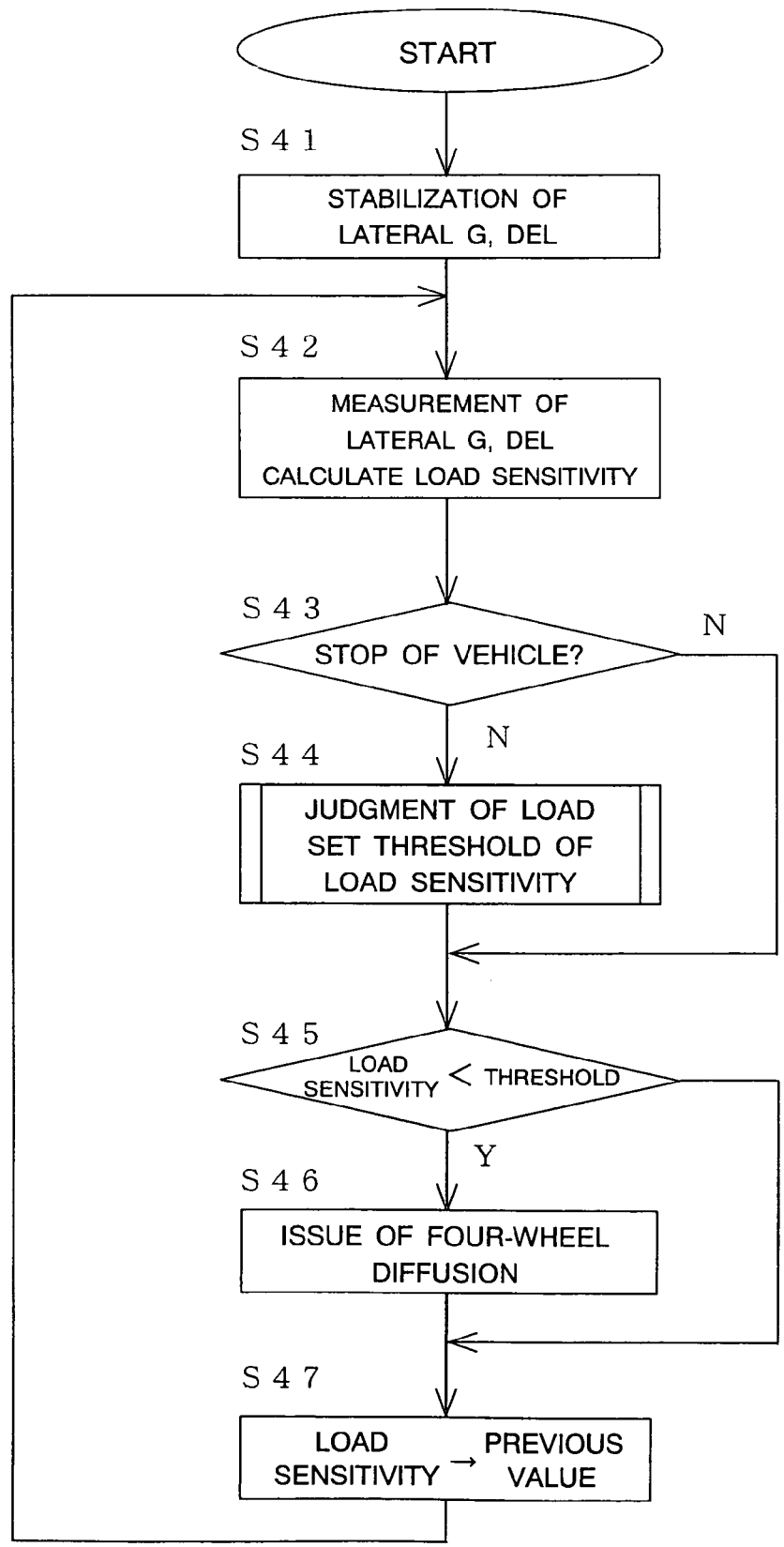
FIG. 4 is a flowchart of the detection of the decreased tire pressures related to the Embodiment of the present invention.
Figure 5:
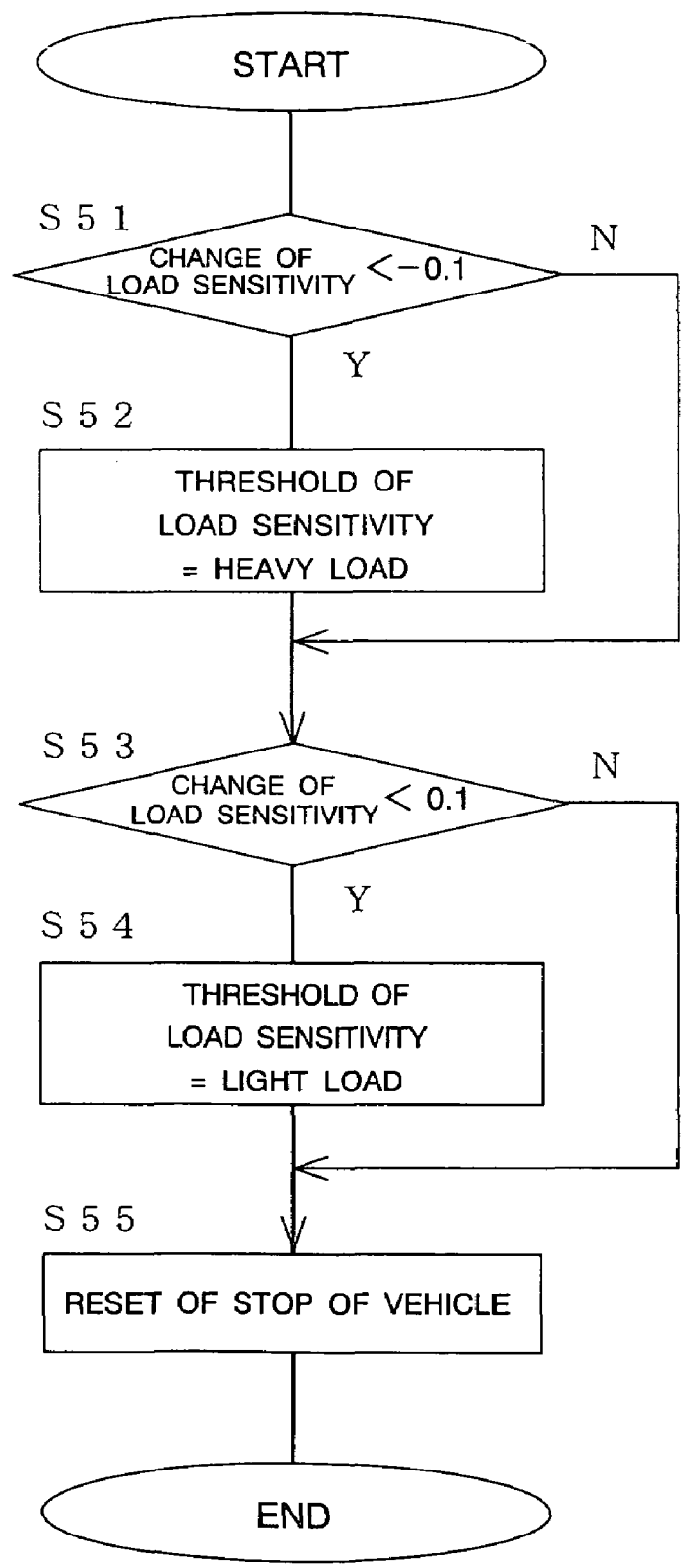
FIG. 5 is a flowchart of the judgment of a load and the setting of the threshold of the load sensitivity related to the Embodiment of the present invention.

FIG. 4 is an example of the flowchart of the tire deflation warning system according to the present invention. FIG. 5 is a flowchart setting the threshold of the load sensitivity which detects the decreased tire pressures by distinguishing the load sensitivity, in the example of the tire deflation warning system related to the present invention. FIG. 5 corresponds to the step S44 of FIG. 4.

The method of judging the decreased tire pressures in the Embodiments excluding the influence of vehicle load from the change of the load sensitivity is illustrated by referring to FIGS. 4 and 5.

The flow of the judgment of the decreased tire pressures is illustrated by referring to FIG. 4. Since the state of tires is not stable from the switching on of an ignition switch until the lapse of a fixed time or a fixed running distance, the DEL value and the data of Lateral G are discarded (Step S41). After the state of tires is stabilized, the DEL value and the data of Lateral G are collected and its regression straight line is calculated by every fixed term (Step S42). Further, the primary coefficient of the regression straight line is to be the load sensitivity. The load sensitivity is calculated at a certain time interval (for example, data for 30 minutes by every two hours). It can be judged, for example, by stabilizing the inclination of the DEL value and Lateral G (for example, the correlative coefficient is a fixed value or more, or the deviation of the primary coefficient of the regression straight line is a fixed value or less) that the state of tires is stabilized.

Then, it is judged whether a vehicle is stopped or not (Step S43). Firstly, since the stop of a vehicle is set by the operation of OFF of an ignition switch described later, it is judged that a vehicle is stopped. When a vehicle is stopped, the setting of the threshold of the load sensitivity which is shown in FIG. 5 is carried out (Step S44).

Then, the load sensitivity is compared with the threshold of the load sensitivity (Step S45), and when the load sensitivity is smaller than the threshold, it is judged as the four-wheel diffusion to issue an alarm (Step S46). When the load sensitivity is the threshold or more, an alarm is not issued.

The load sensitivity is saved as the previous value and the loop is repeated returning to data collection.

When there is the stop of a vehicle in Step S43, the judgment of the load and the setting of the threshold of the load sensitivity shown in FIG. 5 are carried out. Firstly, the primary coefficient (the load sensitivity) of the regression straight line is compared with the previous value (Step S51). When the load sensitivity is smaller than the previous value by a fixed value or more, it is judged that the vehicle load was changed to a heavy load. For example, in the present Embodiment, the threshold is set as 0.1. When the load sensitivity is decreased by 0.1 or more than the last time, the threshold of the load sensitivity judging the four-wheel diffusion is changed to the threshold for the standard loading (Step S52). For example, in the case of diffusion by 40%, it is judged as the four-wheel diffusion and the threshold of the load sensitivity which judges the four-wheel diffusion in the case of the standard loading is set as 0.02 (refer to FIG. 3(d)). When the load sensitivity is enlarged by 0.1 or more than the last time (Step S53), it is judged that the standard loading is changed to the light load from standard load (Step S54) and the threshold of the load sensitivity is set to the light load, for example, 0.35 (see FIG. 2). Then, the stop of a vehicle is reset (Step S54).

When the change of the load sensitivity is a fixed value or less, the threshold of the load sensitivity is not changed (shall be branched to N at Step S51 and Step S53).

Figure 6A:
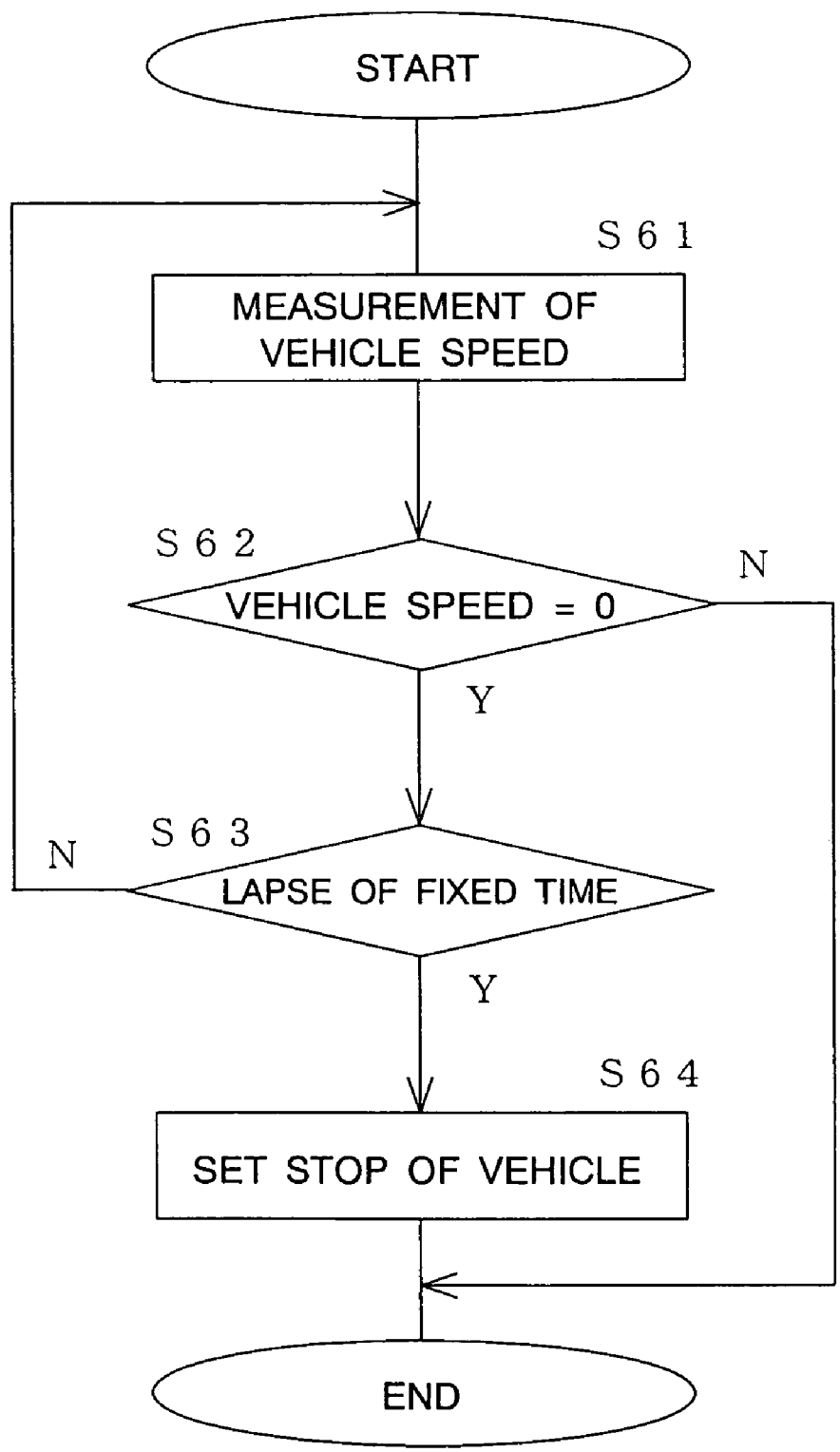
FIG. 6(a) is the processing flowchart of the stop of a vehicle related to the Embodiment of the present invention.
Figure 6B:
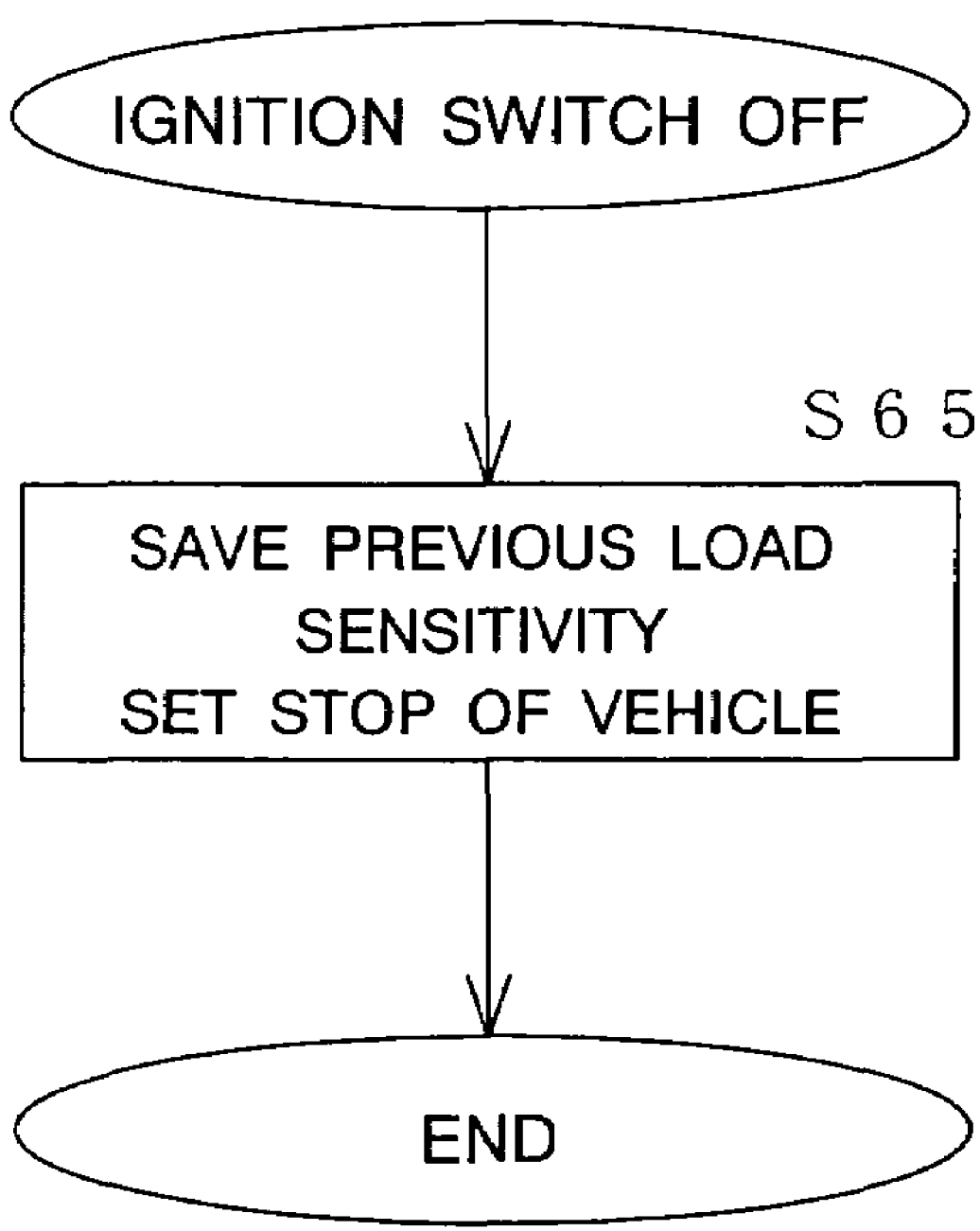
FIG. 6(b) is the processing flowchart of the switching off of an ignition switch related to the Embodiment of the present invention.

It is judged by a separate routine that the vehicle is stopped. FIGS. 6(a) and 6(b) are the flowcharts showing the process of the stop of a vehicle and the switching off of an ignition switch related to the present Embodiment. For example, when the rotational speed of wheels is zero, a routine of judging the stop of a vehicle is activated and when zero speed is successively continued for 3 minutes or more, the stop of a vehicle is set (FIG. 6(a)). As described above, it may he a condition that the output of a speed meter, the P range of an automatic transmission, or a parking break is continuously a fixed value or more for a fixed time. According to the method of FIG. 6(a), control starts and proceeds to measure vehicle speed in step S61 Then, control proceeds to determine, in step S62, whether the vehicle speed is equal to zero. If the vehicle speed equals zero, then control continues to step S63 where it is determined if a fixed period of time has passed during which the vehicle speed is zero. If the determination in step S63 is affirmative, then control proceeds to step S64 to the stop of the vehicle is set and then control ends. If the determination in step S63 is negative, i.e., the vehicle has not been stopped for a fixed period of time, control returns to step S61 to measure vehicle speed. If the vehicle speed is not zero, then the process ends.

Further, when the ignition switch is switched off, the last load sensitivity is saved and the stop of a vehicle is set (FIG. 6(b)). In FIG. 6(b), when the ignition is switched off, control proceeds to step S65, where a previous load sensitivity is saved and the stop of a vehicle is set, and the process ends.

The load condition may be simultaneously outputted in the fore-mentioned Step S52 and Step S54 or Step S47. The load can be utilized for uses other than the tire deflation warning system by outputting the load condition.

Thus, it can be judged whether the load is a light load or a heavy load and the diffusion is judged by the threshold of the load sensitivity in accordance with the load; therefore the judgment of the four-wheel diffusion excluding the influence of the load can be made. As a result, in case of the heavy load, it can be prevented to falsely judge the four-wheel diffusion. Referring to the examples of FIGS. 2(a) to 2(d) and FIGS. 3(a) to 3(d), when the condition is changed from 2 persons boarding to 5 persons boarding+the load of 100 kg in a passenger car (Chevrolet, IMPALA), it is not falsely alarmed that the pressures of four wheels are decreased.

What is claimed is:

1. A computer implemented method of judging a vehicle loading condition, comprising the steps of:
    detecting rotational speeds of wheels mounted on a vehicle;
    calculating a judging value of tire pressures based on the difference of the sum of rotational speeds of two pairs of wheels located at the opposing corners of the vehicle;
    detecting an acceleration in a lateral direction of the vehicle;
    detecting the stop of the vehicle;
    determining a primary coefficient expressing a relationship between the calculated judging value and the detected acceleration in a lateral direction;
    judging the loading state of the vehicle by a change of the primary coefficient before and after a vehicle stop; and
    utilizing the judged loading state of the vehicle.

2. The computer implemented method of judging a vehicle loading condition according to claim 1, wherein the step of detecting the acceleration to a lateral direction comprises calculating the difference of the left and right wheels of the rotational speeds of the wheels.

3. The computer implemented method of judging a vehicle loading condition according to claim 1, wherein the step of detecting the stop of the vehicle comprises detecting that the rotational speeds of the wheels are continuously zero for a fixed time.

4. The computer implemented method of judging a vehicle loading condition according to claim 1, wherein the step of detecting the stop of the vehicle comprises detecting that the ignition switch of the vehicle is switched off.

5. A computerized device for judging vehicle loading condition, comprising:
    means for detecting the rotational speeds of wheels mounted on a vehicle;
    means for calculating the judging value of the tire pressures based on the difference of the sum of rotational speeds of two pairs of wheels located at the opposing corners of the vehicle;
    means for detecting the acceleration to a lateral direction of the vehicle; and
    means for detecting the stop of the vehicle;
    means for determining a primary coefficient expressing a relationship between the calculated judging value and the detected acceleration in a lateral direction; and
    means for judging the loading state of the vehicle by a change of the primary coefficient before and after a vehicle stop.

6. The judging device for vehicle loading condition according to claim 5, wherein the means for detecting the acceleration to a lateral direction includes means for calculating based on the difference of the left and right wheels of the rotational speeds of the wheels.

7. The judging device for vehicle loading condition according to claim 5, wherein the means for detecting the stop of the vehicle includes means for detecting that the rotational speeds of the wheels are continuously zero for a fixed time.

8. The judging device for vehicle loading condition according to claim 5, wherein the means for detecting the stop of the vehicle includes means for detecting that the ignition switch of the vehicle is switched off.

9. A computer implemented detection method of determining decreased tire pressures, comprising the steps of:
    detecting the rotational speeds of four wheels mounted on a vehicle;
    calculating a judging value of the tire pressures based on the difference of the sum of rotational speeds of two pairs of wheels located at the opposing corners of the vehicle; and
    detecting the acceleration in a lateral direction of the vehicle;
    determining a primary coefficient expressing a relationship between the calculated judging value and the detected acceleration in a lateral direction;
    detecting four-wheel diffusion based on the determined primary coefficient before and after a vehicle stop; and
    utilizing the detected four-wheel diffusion.

10. A computerized tire deflation warning system, comprising:
    means for detecting the rotational speeds of wheels mounted on a vehicle;
    means for calculating a judging value of the tire pressures based on the difference of the sum of rotational speeds of two pairs of wheels located at the opposing corners of the vehicle;

means for detecting the acceleration in a lateral direction of the vehicle;

means for determining a primary coefficient expressing a relationship between the calculated judging value and the detected acceleration in a lateral direction;

mean for detecting a vehicle stop means for detecting four-wheel diffusion based on determining if the primary coefficient is changed from before a vehicle stop to after a vehicle stop by a fixed value.

* * * * *